Aug. 19, 1958     J. J. FISCHER     2,848,285
ROTARY SHAFT SEAL
Filed March 8, 1956
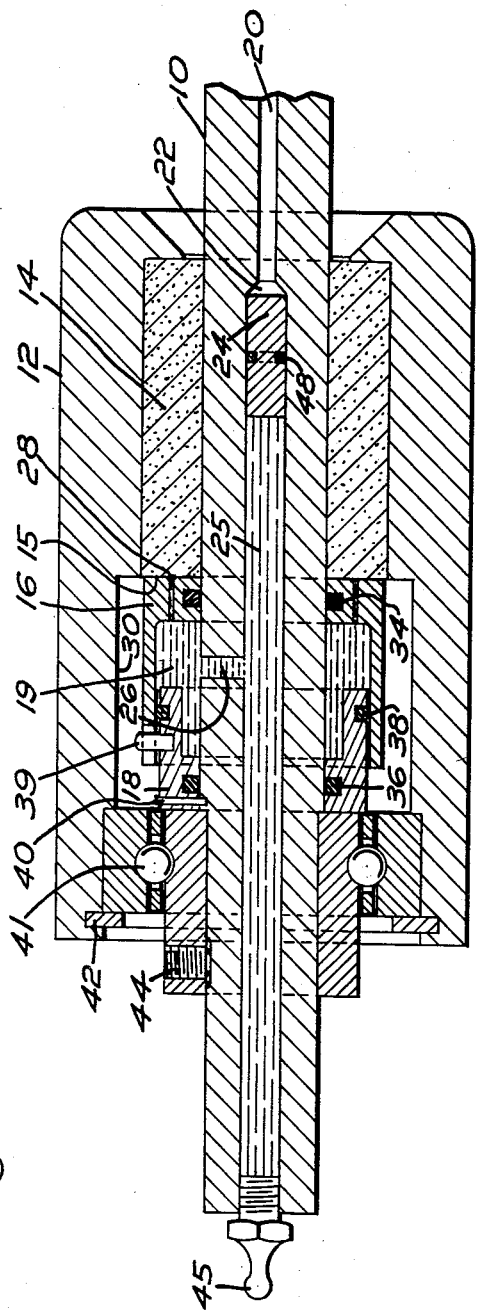
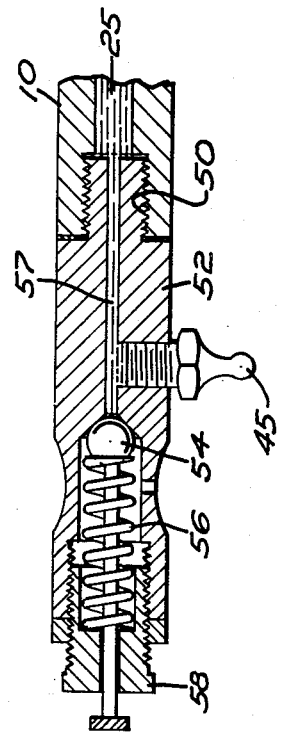
INVENTOR.
JOHN J. FISCHER
BY
Beau, Brooks, Buckley & Beau,
ATTORNEYS.

United States Patent Office 2,848,285
Patented Aug. 19, 1958

2,848,285

ROTARY SHAFT SEAL

John J. Fischer, East Stroudsburg, Pa., assignor to The Patterson-Kelley Co., Inc., East Stroudsburg, Pa.

Application March 8, 1956, Serial No. 570,283

4 Claims. (Cl. 308—187.1)

This invention relates to improvements in rotary shaft seals, and more particularly to an improved form of seal for use in conjunction with a shaft rotating in a stationary bearing housing in conjunction with a pressure vessel whereby the rotating shaft extends into a high pressure atmosphere tending to express the contents of the pressure vessel outwardly through the shaft bearing.

It is a primary object of the invention to provide an improved shaft seal device for use in a situation as aforesaid, whereby the pressure interiorly of the vessel is employed to maintain the seal mechanism in optimum operative condition under varying pressure loads and in spite of wearing away of the bearing and/or sealing parts.

Another object of the invention is to provide a seal as aforesaid which is automatically self-adjusting and self-aligning to the shaft and bearing components; and which is at all times operable independently of any failure of any external pressure source.

Another object of the invention is to provide a shaft seal as aforesaid which is particularly adapted to operate under high pressures and under varying internal pressure conditions to insure optimum sealing effects while at the same time avoiding galling of the relatively moving parts.

Another object of the invention is to provide an improved shaft seal as aforesaid which may be readily constructed to operate with maximum efficiency under any temperature conditions such as may be normally encountered in the rotary machine art.

Another object of the invention is to provide an improved rotary seal device as aforesaid which is automatically self-lubricating.

Other objects and advantages of the invention will appear in the specification hereinafter.

In the drawing:

Fig. 1 is a fragmentary sectional view through a rotary seal device of the invention; and Fig. 2 is a fragmentary sectional view through a portion of the device of Fig. 1, illustrating in conjunction therewith a pressure release safety valve device, as an optional accessory.

The present invention contemplates provision of a novel rotary seal device which provides for the machine designer a full choice of differential pressure loadings at opposite sides of the relatively moving sealing components, with a view to insuring under all conditions a perfect seal while at the same time avoiding galling of the relatively moving seal parts. In the design of rotary seal devices it is an accepted assumption that the pressure (against which the sealing device operates) at the sealing face will penetrate the seal bearing up to the mean diameter of the sealing face. Therefore, if the relatively moving components of the seal device comprise polished surfaces, the back pressure load from the vessel will equal the unit pressure interiorly of the vessel times one-half the polished seal face area. In the case of the present invention the opposing pressure load, such as may be obtained through use of an oil piston driven by the pressure interiorly of the sealed vessel, will equal the unit pressure times the internal end area of the annular seal chamber. This latter dimension is preferably preselected to provide the preferred differential loading effect, so as to obtain an efficient sealing effect while at the same time avoiding wear and/or galling of the relatively moving components.

As illustrated in the accompanying drawing, a sealing device of the invention is shown as being provided in conjunction with a shaft 10 such as may be in any suitable manner journaled for relative rotation in conjunction with a pressure vessel or the like, and arranged to extend through and to rotate relative to a housing member as indicated at 12 forming a portion of the above-mentioned pressure vessel. As shown in Fig. 1, the shaft 10 is rotatably mounted within the housing 12, by means of any suitable bearing, such as a pressure sealing sleeve of carbon-graphite compound as indicated at 14 which may be press-fitted into the housing 12 during initial assembly of the sealing device. The left hand end face portion of the bearing 14, as indicated at 15, provides the pressure sealing face of the device, and an annular seal member 16 is arranged to reside in slide bearing relation against the left hand end portion of the bearing 14 while rotating with the shaft 10. Another seal member 18 in the form of an annulus surrounding the shaft 10 is arranged in telescopic relation with the seal member 16; the seal members being so shaped and arranged as to provide therebetween an annular fluid pressure chamber 19 adapted to accommodate a supply of fluid under pressure therein for constantly urging the seal members to spread apart; thereby exerting a constant sealing pressure between the member 16 and the sealing face 15 of the bearing 14.

As indicated at 20, the shaft 10 is centrally bored in communication with the interior of the pressure vessel of which the shaft 10 is a part; the bore 20 being enlarged as indicated at 22 at a position interiorly of the bearing housing 12 to accommodate in free sliding relation therein a piston 24. The enlarged bore portion 22 of the shaft 10 is filled as indicated at 25 with oil or grease or other suitable natural or synthetic fluid which is preferably of lubricating qualities; or in lieu thereof, a fluidized solid lubricant may be employed, which ever is preferred. A transverse bore 26 is provided in the shaft 10 to intercommunicate the bore 22 and the pressure chamber 19 between the sealing members 16–18. Thus, it will be appreciated that the pressure interiorly of the vessel serviced by the shaft 10 is freely communicated to the bores 20—22 and thence to the piston 24, and is thereby imposed upon the lubricating fluid 25; thereby forcing the latter through the bore 26 to the pressure chamber 19.

This application of pressure in the chamber 19 causes the sealing members 16—18 to be maintained in spaced apart relation and in firmly sealing bearing relation against the sealing face 15 of the bearing 14. Preferably, as indicated at 28, the sealing member 16 is provided with longitudinal orifices through which minor quantities of lubricating fluid may bleed to the sealing face 15 of the bearing 14; thereby providing the sealing device to be self-lubricating.

The sealing members 16—18 are housed within a chamber portion 30 of the housing 12. The seal member 16 is pressure-sealed to the shaft 10 such as by means of an O-ring device as indicated at 34; the seal member 18 is similarly sealed to the shaft 10 as by means of an O-ring device 36; and the sealing members 16—18 are relatively pressure-sealed as by means of an O-ring device as indicated at 38. A spline key device as indicated at 39 interconnects the seal members 16—18 so as to maintain them against relative rotation while permitting the member 16 to move in a direction axially of the shaft 10 in response to the pressure forces exerted therebetween by the fluid pressure in the chamber 19. A pin 40 locks the member 18 to the shaft 10.

The bearing housing structure is completed as shown in Fig. 1 by means of an end-thrust bearing as indicated at 41 which backs up the seal member 18 and is retained in operative position in the housing 12 by means of a snap-ring 42 and set screw 44. The outer end portion of the shaft 10 is conveniently equipped with any suitable check-valve device as indicated at 45, such as for example of the well-known "Alemite" fitting type; whereby an oil or grease supply device may be coupled thereto for delivery of a supply of oil or grease under pressure into the bore 22 of the shaft 10 as may be required for maintaining the latter in substantially filled condition as illustrated in Fig. 1.

Thus, it will be appreciated that the bearing and seal device of the invention comprises a structurally simple yet rugged assembly of parts wherein the seal members 16—18 are locked to the shaft 10 to rotate therewith and are pressure-sealed relative thereto by means of O-rings while being at the same time expansible in directions longitudinally of the shaft 10. Hence, the members maintain a constant uniform sealing pressure against the bearing face 15 in response to and as a function of the pressure internally of the pressure vessel from which the shaft 10 extends. Thus, the sealing device automatically seals the associated pressure vessel regardless of fluctuations of pressure forces therein, because the sealing bearing pressure exerted by the member 16 against the bearing 15 is a function of the fluid pressure forces within the associated vessel. This automatic adjustment of the pressure force of the sealing member prevents galling of the relatively moving parts, and inasmuch as the pressure of the associated vessel is transmitted to the sealing device by means of a lubricant type liquid as indicated at 25, the sealing device is automatically self-lubricated under all operative conditions.

As indicated at 48, the piston 24 is preferably pressure-sealed in the bore of the shaft 10 by means of an O-ring seal device. In event the associated pressure vessel is intended to be employed in conjunction with a relatively high temperature operation such as might cause the fluid 24 within the shaft 10 to become heated to such degree as to expand due to the temperature increase, a pressure release valve device as indicated in Fig. 2 is preferably added to the mechanism of Fig. 1. Thus, as shown in Fig. 2, the extreme outer end of the shaft 10 may be conveniently counterbored and tapped as indicated at 50 so as to receive in screwthreaded relation therein the end of a valve body 52 having a check valve ball 54 normally seated in closed position therein under the influence of a compression spring 56. Thus, if the pressure on the fluid 25 within the bore of the shaft 10 becomes excessive due to a temperature rise therein, this pressure is simply transmitted through the bore 57 of the valve body 52 and then operates to unseat the ball valve 54 against the action of the spring 56, for release of such excess pressure. As shown in Fig. 2, the check valve 54 may be conveniently held by the spring 56 in operative position by means of a screwthreaded thimble 58; as is well known in the valve art. The oil supply fitting 45, as explained hereinabove in connection with the mechanism of Fig. 1, may be conveniently installed in conjunction with the pressure release valve, as shown in Fig. 2.

Although only one form of the invention has been shown and described in detail, it will be apparent to those skilled in the art that the invention is not so limited but that various changes may be made therein without departing from the spirit of the invention or the scope of the appended claims.

I claim:

1. A rotary shaft seal comprising a housing adapted to be stationarily mounted to accommodate therein a rotating shaft, said housing having a pressure sealing sleeve bearing at one end therewithin encircling the rotating shaft and having an annular chamber at its outer end, an end thrust ball bearing closing the outer end of said chamber and positionally keyed to said shaft and to said housing, a pressure-expansive sealing device mounted about said shaft within said chamber and comprising a pair of telescopically related cylinders bottomed against said sleeve and ball bearing, respectively, and pressure-sealed to said shaft and to each other, said cylinders being formed to provide interiorly thereof a fluid chamber, said shaft being longitudinally bored for connection in communication with a fluid pressure source and provided with a lateral bore outlet in communication with said fluid chamber, a pressure transmission piston disposed interiorly of said shaft bore and slidable therein, said piston being located between the lateral outlet of said shaft and said fluid pressure source, and a lubricating fluid under pressure filling said shaft bore and said fluid chamber, whereby the pressure from said pressure source will bias said piston against said fluid in said shaft bore thereby biasing one of said sealing cylinders into sealing relation against said sleeve, the pressure exerted by said seal against said bearing being a function of the pressure derived from said source.

2. A rotary shaft seal comprising a housing mounting therein a relatively rotating shaft, said housing mounting an end thrust bearing and a pressure sealing sleeve at opposite ends therewithin and having a sealing chamber therebetween, a pressure-expansive sealing device mounted about said shaft within said sealing chamber and comprising a pair of telescopically related annuli backed against said end thrust bearing and sealing sleeve and pressure-sealed to said shaft and to each other, said annuli being formed interiorly thereof with a fluid chamber, said shaft being longitudinally bored for connection in communication with a pressure source and provided with a lateral bore outlet in communication with said fluid chamber, a pressure transmission piston disposed interiorly of said shaft bore and slidable therein, said piston being located between the lateral outlet of said shaft and said fluid pressure source, and a lubricating fluid filling said bore and said fluid chamber, whereby pressure from said pressure source will bias said piston against the fluid within said chamber thereby biasing one of said sealing annuli into bearing sealing relation with said sealing sleeve.

3. A rotary shaft seal comprising a housing adapted to be stationarily mounted to accommodate therein a rotating shaft, said housing having an end thrust pressure sealing bearing at one end thereof encircling the rotating shaft and said housing having an annular chamber at its other end encircling said shaft, an end thrust bearing closing said chamber at said other end of said housing and positionally fixed to said shaft and to said housing, a pressure-expansive sealing device mounted about said shaft within said chamber and comprising telescopically related cups bottomed against said end thrust bearings respectively and pressure-sealed to said shaft and to each other, said cups being formed to provide interiorly thereof a fluid chamber, said shaft being longitudinally bored in communication with a fluid pressure source and provided with a fluid outlet in communication with said fluid chamber, a pressure transmission piston disposed interiorly of said shaft bore and slidable therein, said piston being located between the lateral outlet of said shaft and said fluid pressure source, and a fluid under pressure filling said shaft bore and said fluid chamber, whereby the pressure from said pressure source will bias said piston against the fluid in said shaft bore thereby biasing one of said cups into shaft-sealing relation against said pressure sealing bearing.

4. A rotary shaft seal comprising a housing mounting therein a relatively rotating shaft, said housing mounting an end thrust bearing and a pressure sealing sleeve in spaced relation therewithin and having a sealing chamber therebetween, a pressure-expansive sealing device mounted about said shaft within said sealing chamber and comprising a pair of annuli backed against said end thrust bearing and said pressure sleeve respectively and pressure-sealed to said shaft and to each other, said annuli being shaped to provide interiorly thereof a fluid chamber, said shaft being longitudinally bored for connection in communication with a pressure source and provided with a fluid outlet in communication with said fluid chamber, a piston disposed interiorly of said shaft bore and slidable therein, said piston being located between the lateral outlet of said shaft and said fluid pressure source, and a fluid filling said bore and said fluid chamber, whereby pressure from said pressure source will bias said piston against the fluid within said chamber thereby biasing one of said sealing annuli into bearing relation with said pressure sleeve.

References Cited in the file of this patent

UNITED STATES PATENTS

| | | |
|---|---|---|
| 1,782,656 | Joyce | Nov. 25, 1930 |
| 2,244,450 | Erni | June 3, 1941 |
| 2,584,705 | Hornschuch | Feb. 5, 1952 |

FOREIGN PATENTS

| | | |
|---|---|---|
| 10,164 | Australia | Nov. 15, 1932 |